(12) United States Patent
Noda

(10) Patent No.: US 9,004,212 B2
(45) Date of Patent: Apr. 14, 2015

(54) MACHINE MAIN BODY AND OPERATING MACHINE PROVIDED WITH SAME

(71) Applicant: Kobelco Construction Machinery Co., Ltd., Hiroshima (JP)

(72) Inventor: Tsuyoshi Noda, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 0 days.

(21) Appl. No.: 14/346,568

(22) PCT Filed: Sep. 21, 2012

(86) PCT No.: PCT/JP2012/006004
§ 371 (c)(1),
(2) Date: Mar. 21, 2014

(87) PCT Pub. No.: WO2013/046614
PCT Pub. Date: Apr. 4, 2013

(65) Prior Publication Data
US 2014/0238760 A1 Aug. 28, 2014

(30) Foreign Application Priority Data
Sep. 30, 2011 (JP) .................................. 2011-216728

(51) Int. Cl.
*B62D 25/12* (2006.01)
*B66C 13/52* (2006.01)
(Continued)

(52) U.S. Cl.
CPC ................ *B66C 13/52* (2013.01); *B62D 25/12* (2013.01); *B60J 7/1642* (2013.01); *E02F 9/0891* (2013.01)

(58) Field of Classification Search
CPC ....... B62D 25/10; B62D 25/12; E02F 9/0891; E05B 83/24
USPC ............... 180/69.24, 69.2, 69.21, 89.17; 296/193.11; 16/348; 292/338
See application file for complete search history.

(56) References Cited

U.S. PATENT DOCUMENTS 1,707,511 A * 4/1929 Cornwell ..................... 217/60 D
2,090,473 A * 8/1937 Crabb ......................... 217/60 C
(Continued)

FOREIGN PATENT DOCUMENTS

JP 03121089 * 12/1991
JP 2007-008364 1/2007
(Continued)

OTHER PUBLICATIONS

International Search Report issued Dec. 11, 2012, in PCT/JP2012/006004, filed Sep. 21, 2012.

*Primary Examiner* — J. Allen Shriver, II
*Assistant Examiner* — Emma K Frick
(74) *Attorney, Agent, or Firm* — Oblon, McClelland, Maier & Neustadt, L.L.P.

(57) ABSTRACT

A first panel includes an engaging section configured to engage with an engaged section so as to allow displacement of the engaged section according to swinging of a hood between a closed position and an open position and restrict the swinging of the hood in a state where an opening section is opened. The engaging section engages with the engaged section such that the engaged section is detachable by being displaced in a predetermined first direction. The machine main body further includes an auxiliary supporting section provided in a machine room and configured to restrict, by detachably supporting the engaged section detached from the engaging section, the swinging of the hood in a state where the opening section is opened.

10 Claims, 9 Drawing Sheets

(51) Int. Cl.
*B60J 7/16* (2006.01)
*E02F 9/08* (2006.01)

(56) References Cited

U.S. PATENT DOCUMENTS

| | | | | |
|---|---|---|---|---|
| 2,193,112 | A * | 3/1940 | Peterson | 292/214 |
| 2,587,200 | A * | 2/1952 | Nottingham | 217/60 C |
| 3,398,985 | A * | 8/1968 | Rhoades | 296/57.1 |
| 4,125,170 | A * | 11/1978 | Botz | 180/69.21 |
| 5,414,898 | A * | 5/1995 | Gastaldi | 16/348 |
| 5,570,493 | A * | 11/1996 | Gulick | 27/18 |
| 6,030,029 | A * | 2/2000 | Tsuda et al. | 296/203.02 |
| 6,371,231 | B1 * | 4/2002 | Nushii et al. | 180/69.21 |
| 6,460,644 | B1 * | 10/2002 | Smith et al. | 180/89.17 |
| 6,892,843 | B2 * | 5/2005 | Schillaci et al. | 180/69.21 |
| 7,377,561 | B2 * | 5/2008 | Shin | 292/262 |
| 8,469,130 | B2 * | 6/2013 | Werner et al. | 180/89.14 |
| 8,480,141 | B2 * | 7/2013 | Lee | 292/338 |
| 8,550,534 | B2 * | 10/2013 | Tsukamoto et al. | 296/146.1 |
| 8,646,556 | B2 * | 2/2014 | Shimada et al. | 180/69.2 |
| 8,875,939 | B2 * | 11/2014 | Phillips et al. | 220/832 |
| 2006/0082164 | A1 * | 4/2006 | Shin | 292/262 |
| 2010/0146860 | A1 | 6/2010 | Tsukamoto et al. | |
| 2014/0252785 | A1 * | 9/2014 | Kim | 292/338 |

FOREIGN PATENT DOCUMENTS

| | | |
|---|---|---|
| JP | 2007-069673 | 3/2007 |
| JP | 2007-186170 | 7/2007 |
| JP | 2010-144378 | 7/2010 |
| JP | 2010-254021 | 11/2010 |
| KR | 1020050006596 | * 1/2005 |

* cited by examiner

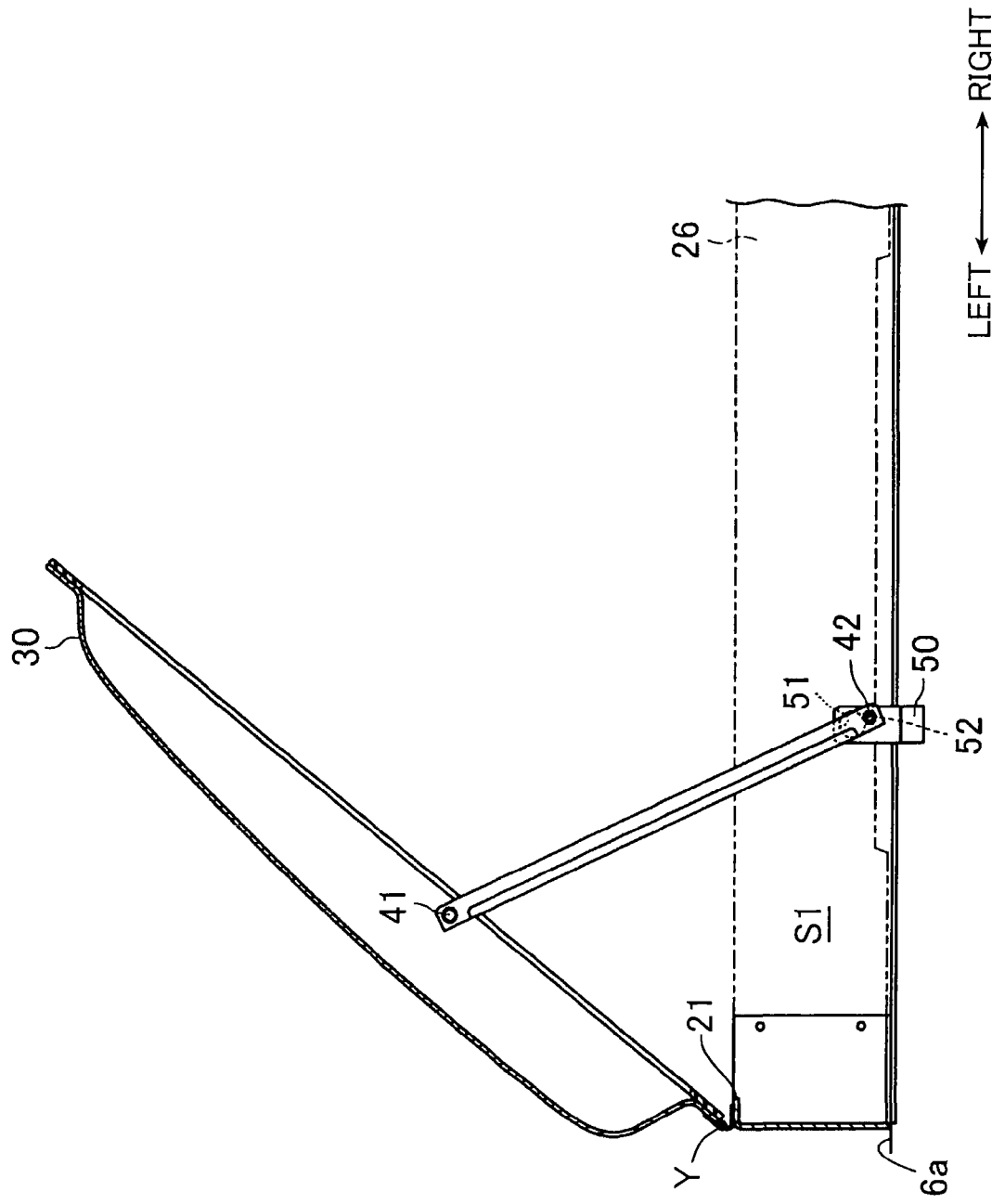

MACHINE MAIN BODY AND OPERATING MACHINE PROVIDED WITH SAME

TECHNICAL FIELD

The present invention relates to an operating machine including a crane and a hydraulic shovel having a machine housing section configured to house a machine including an engine and a lid member for covering an opening formed in the machine housing section.

BACKGROUND ART

There has been known, for example, operating machines described in Patent Document 1 and Patent Document 2.

A hydraulic shovel described in Patent Document 1 is provided with a machine room cover (a machine housing section) for covering a machine room and a bonnet for covering an opening section of the machine room cover. The bonnet includes a frame-like raising member provided in the machine room cover to surround the periphery of the opening section and a hood member (a lid member) configured to close an opening in an upper part of the raising member. A part of the raising member is detachable from the machine room cover in order to improve workability.

A hydraulic shovel described in Patent Document 2 is provided with a vehicle body section (a machine housing section) configured to house an engine and the like, an engine hood (a lid member) for covering an upper opening provided in the vehicle body section, and a gas spring for supporting opening and closing of the engine hood. In the hydraulic shovel described in Patent Document 2, the gas spring is detachable and movable.

Specifically, in the hydraulic shovel described in Patent Document 2, a part (a first vehicle body frame) of a vehicle body frame configuring a frame work portion of the vehicle body section is detachable from the vehicle body section.

At normal time, one end portion (a first end) of the gas spring is attached to the first vehicle body frame by a pin. The other end portion (a second end) of the gas spring is attached to the engine hood by a pin.

On the other hand, when the first vehicle body frame is detached, an attachment destination of the first end of the gas spring is lost. Therefore, the hydraulic shovel described in Patent Document 2 is provided with a first end temporary fixing section and a second end temporary fixing section for temporarily fixing the gas spring. Specifically, the first end temporary fixing section is provided in a second vehicle body frame fixed to the vehicle body section. The second end temporary fixing section is provided in the engine hood. The first end is screwed to the first end temporary fixing section and the second end is screwed to the second end temporary fixing section, whereby the gas spring is temporarily fixed.

The hydraulic shovel of Patent Document 2 is provided with the first end temporary fixing section. Therefore, even if the first end of the gas spring loses an attachment destination thereof, the gas spring can be moved.

However, when the gas spring is moved, work for attaching and detaching the pins and the screws is necessary. Therefore, tools are necessary for attachment and detachment of the pins and the screws. It is likely that the pins, the screws, or the tools are dropped into the vehicle body section by mistake. During the work of moving the gas spring, it is necessary to keep the engine hood in an open state. Therefore, it is difficult for a person to perform the work alone.

Patent Document 1: Japanese Patent Application Laid-open No. 2010-144378

Patent Document 2: Japanese Patent Application Laid-open No. 2010-254021

SUMMARY OF THE INVENTION

It is an object of the present invention to provide a machine main body in which the work of moving a supporting member for supporting a lid member with respect to a machine housing section can be easily performed and a operating machine provided with the machine main body.

In order to solve the problems, the present invention provides a machine main body provided on a lower propelling body of an operating machine, the machine main body including: a machine housing section configured to form a machine room for housing a predetermined machine, and including an opening section for opening the machine room upward; a lid member swingable with respect to the machine housing section between a closed position for closing the opening section and an open position for opening the opening section; a supporting member including a first end rotatably supported with respect to the lid member and a second end detachably supported to the machine housing section, the supporting member supporting the lid member such that the swinging of the lid member is restricted in a predetermined swinging position; and an auxiliary supporting section provided in the machine room and configured to detachably support the second end of the supporting member detached from the machine housing section such that the swinging of the lid member is restricted. The machine housing section includes: a housing section main body; and an attaching and detaching section configuring at least a part of an edge portion of the opening section, and attachable and detachable to and from the housing section main body in a state where the second end of the supporting member is supported by the auxiliary supporting section. The attaching and detaching section includes: an engagement groove configured to engage with, in a state where displacement of the second end of the supporting member along a first route is allowed, the second end of the supporting member such that the lid member is allowed to swing between the closed position and the open position and the swinging of the lid member is restricted in the open position; and a detachment groove branching from the engagement groove and capable of guiding, by allowing displacement of the second end of the supporting member along a second route deviating from the first route, the second end of the supporting member to a position where the second end is released from the engagement by the engagement groove.

According to the present invention, it is possible to easily perform the work of moving the supporting member for supporting the lid member with respect to the machine housing section.

BRIEF DESCRIPTION OF THE DRAWINGS

FIG. 9 is a schematic diagram showing the second supporting position.

MODE FOR CARRYING OUT THE INVENTION

An embodiment of the present invention is explained below with reference to the accompanying drawings. Note that the embodiment explained below is an embodied example of the present invention and is not of a character to limit the technical scope of the present invention.

Figure 1:
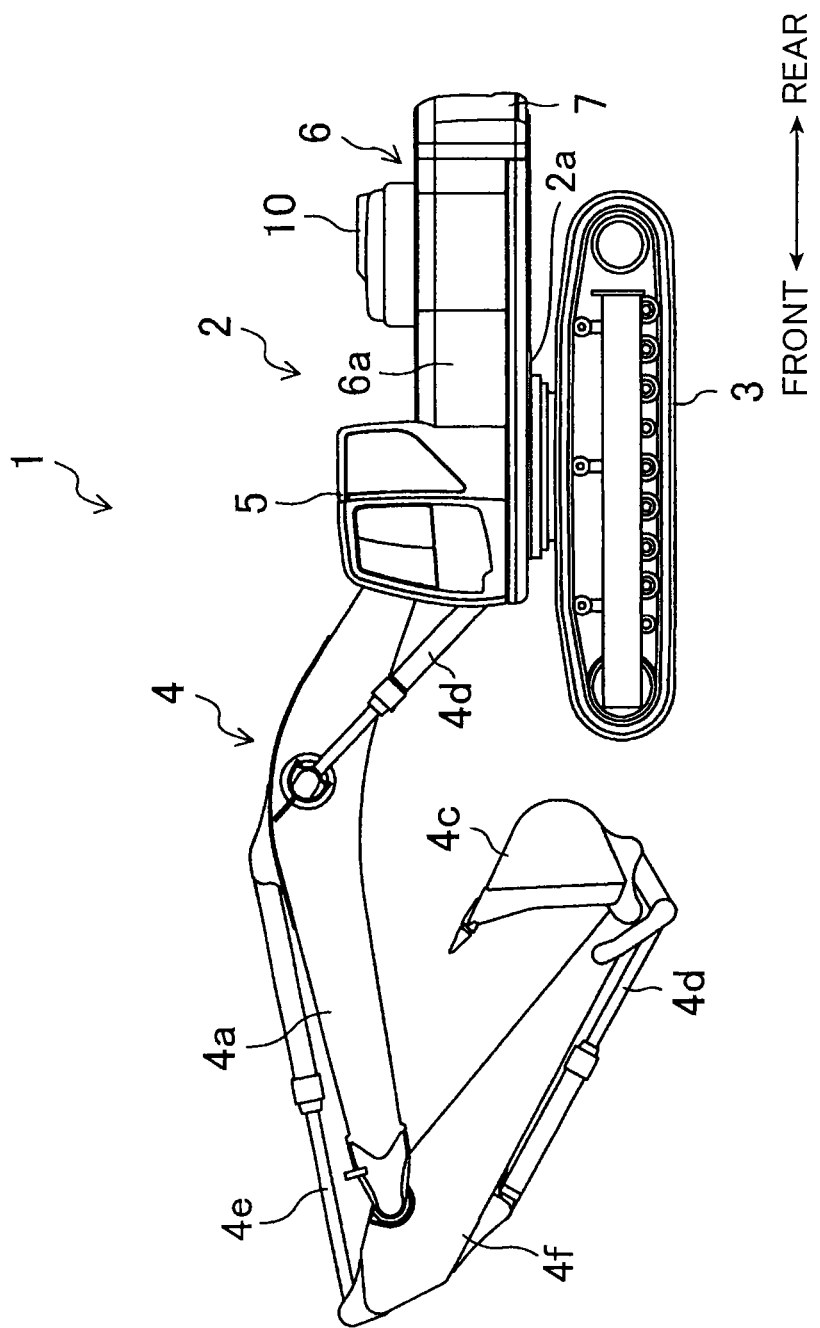
FIG. 1 is a schematic diagram showing a hydraulic shovel according to an embodiment of the present invention.
Figure 2:
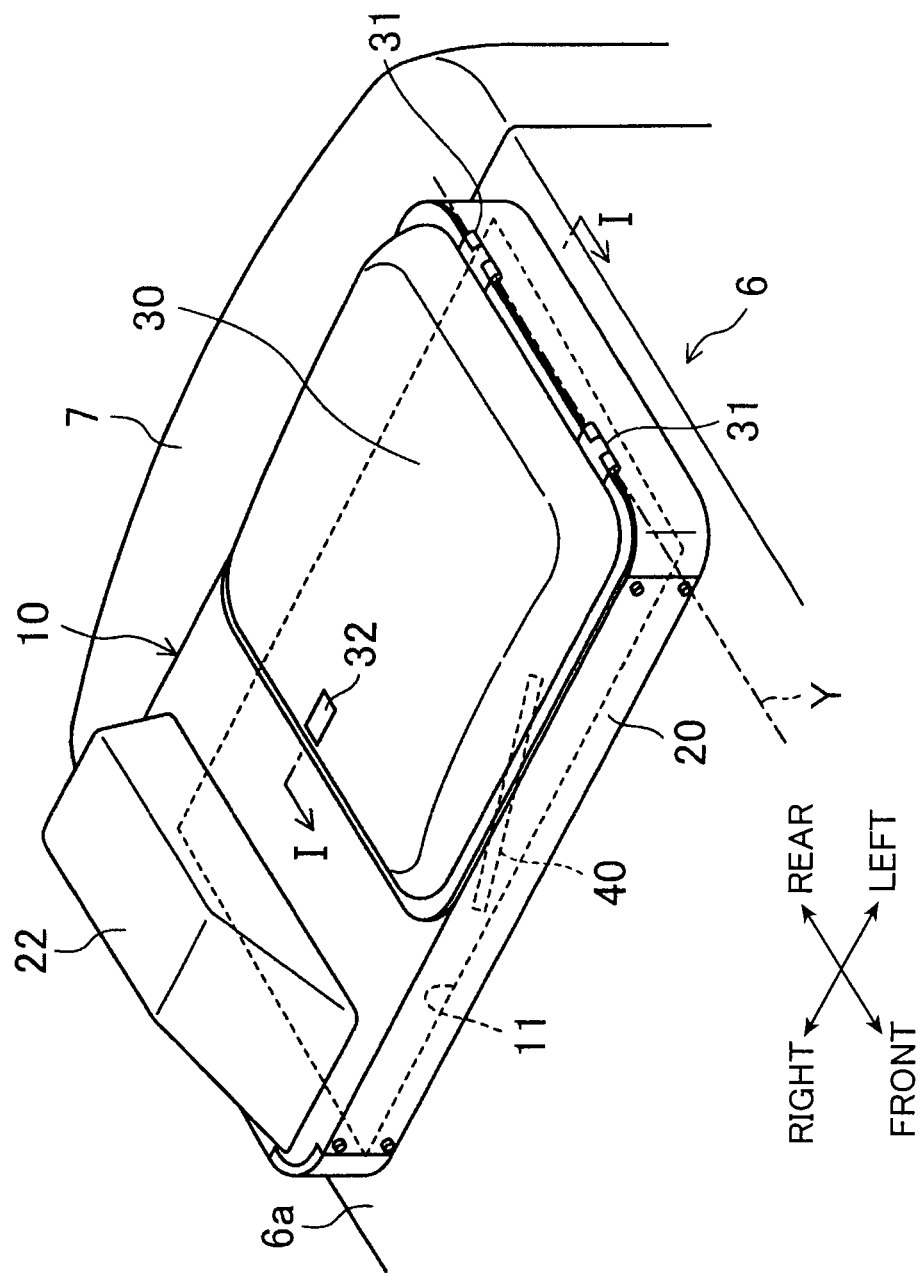
FIG. 2 is a schematic perspective view showing a state where a rear part of a machine main body shown in FIG. 1 is viewed from above.

FIG. 1 shows a hydraulic shovel 1, which is an example of an operating machine according to the present invention. FIG. 2 is a schematic perspective view showing a state where a rear part of a machine main body shown in FIG. 1 is viewed from above.

Referring to FIG. 1 and FIG. 2, the hydraulic shovel 1 is a relatively large model. Specifically, the hydraulic shovel 1 is provided with a lower propelling body 3 of a crawler type and a relatively large machine main body 2 turnably provided on the lower propelling body 3.

The machine main body 2 is provided with an upper frame 2a turnably attached on the lower propelling body 3 and a work apparatus 4, a cab 5, a machine housing section 6, an auxiliary supporting section 50 (see FIG. 4), a hood (a lid member) 30, a stay (a supporting member) 40, and a counter weight 7, each of which is provided on the upper frame 2a. Note that, in the following explanation, front, rear, left, and right directions viewed from an operator seated on an operator's seat of the cab 5 are used.

The work apparatus 4 is provided in a front part of the upper frame 2a so as to enable to be raised and lowered. Specifically, the work apparatus 4 is provided with a boom 4a including a proximal end portion attached to the upper frame 2a so as to enable to be raised and lowered, an arm 4b including a proximal end portion swingably attached to a distal end portion of the boom 4a, and a bucket 4c swingably attached to a distal end portion of the arm 4b. The work apparatus 4 is provided with a boom cylinder 4d for raising and lowering the boom 4a with respect to the upper frame 2a, an arm cylinder 4e for swinging the arm 4b with respect to the boom 4a, and a bucket cylinder 4f for swinging the bucket 4c with respect to the arm 4b. The counter weight 7 is provided in a rear part of the upper frame 2a in order to maintain a balance in the front-and-rear direction between the work apparatus 4 and the counter weight 7

The cab 5 (an operator's cab) is provided in a front part of the upper frame 2a to be adjacent to the work apparatus 4. In the cab 5, various operation devices (not shown in the figure) for receiving operation by the operator in order to actuate the cylinders 4d to 4f are provided.

The machine housing section 6 occupies a most part other than the work apparatus 4 and the cab 5 in a space on the upper frame 2a. As shown in FIG. 2, the machine housing section 6 forms a machine room S1 for housing devices including an engine, a hydraulic pump, a fuel tank, and a hydraulic oil tank (not shown in the figure) and includes an opening section 21 for opening the machine room S1 upward. Specifically, the machine housing section 6 includes a machine room cover (a housing section main body) 6a for covering the devices from above and sides and a panel 20 standing on the machine room cover 6a and having the opening section 21 formed on the upper surface thereof. In this embodiment, the panel 20, a below-mentioned hood 30, and a below-mentioned stay 40 configure a bonnet 10.

The bonnet 10 is provided on the machine room cover 6a to thereby partially upwardly broaden the machine room S1. The large hydraulic shovel 1 is required to have large power. Therefore, an engine, a cooler, and the like (these are also referred to as engine related devices) mounted on the hydraulic shovel 1 are also increased in size. As a result, in the hydraulic shovel 1 according to this embodiment, a part of the engine related devices are arranged above the upper surface of the machine room cover 6a. The bonnet 10 covers a part of the engine related devices arranged above the upper surface of the machine room cover 6a.

Figure 3:
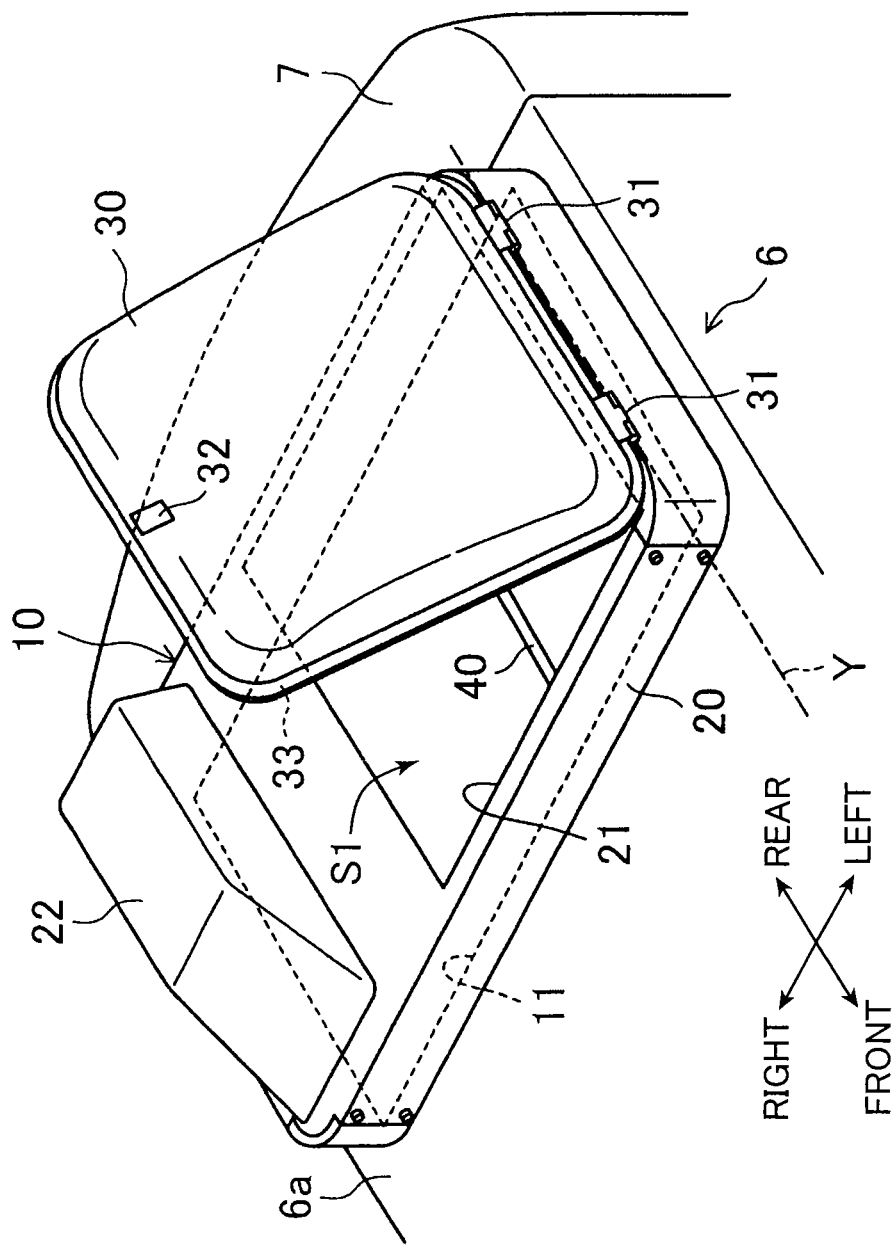
FIG. 3 is a schematic perspective view showing a first supporting position for a hood shown in FIG. 2.

FIG. 3 shows a state where a rear part of the machine housing section 6 is viewed from above. Referring to FIG. 2 and FIG. 3, in the hydraulic shovel 1 according to this embodiment, the engine related devices are set in a rear part of the machine room S1. Therefore, the bonnet 10 is provided in the rear part of the machine housing section 6. Since the operator climbs on the machine housing section 6 and performs inspection work and the like, the upper surface of the machine room cover 6a is flat as a whole to facilitate this work. On the upper surface of a rear part of the machine room cover 6a, a window section 11 penetrating through the machine room cover 6a in the up-and-down direction is formed to extend in the left-and-right direction.

The bonnet 10 is assembled to the machine room cover 6a to cover the window section 11. The bonnet 10 according to this embodiment is assembled separately from the machine room cover 6a and thereafter assembled to the machine room cover 6a.

The panel 20 is standing on an edge portion of the window section 11 in the machine room cover 6a. Specifically, the panel 20 is configured by combining a plurality of element members formed by, for example, pressing a steel plate. The panel 20 has a flat box-like appearance long in the left-and-right direction. On the upper surface of the panel 20, the opening section 21 which is rectangular in plan view extending from an end on one end side (the left side) to the other end (the right side) in the longitudinal direction of the panel 20 is formed. In a portion on the right side of the upper surface of the panel 20, a projecting section 22 for covering a part of the engine related devices projecting from the window section 11 is formed. The projecting section 22 is formed in a trapezoidal shape when viewed along the left-and-right direction.

Before explaining the specific configuration of the panel 20, the configurations of the hood 30 and the stay 40 are explained below.

The hood 30 is swingable with respect to the panel 20 between a closed position (see FIG. 5) for closing the opening section 21 and an open position (see FIG. 7) for opening the opening section 21. Specifically, the hood 30 is a dome-like member formed a size larger than the opening section 21 in plan view. The hood 30 is supported via hinges 31 at an end portion further on the left side than the opening section 21 of the panel 20. The hood 30 is swingable around a swing axis Y extending along the width direction of the panel 20 (the front-and-rear direction of the hydraulic shovel 1) for opening and closing the opening section 21 by the hinges 31. At a distal end portion of the hood 30, a lock mechanism 32 for locking the hood 30 to the machine room cover 6a is provided. On the lower surface of an edge portion of the hood 30, a packing 33 for closing a gap between the panel 20 and the hood 30 is attached.

Figure 7:
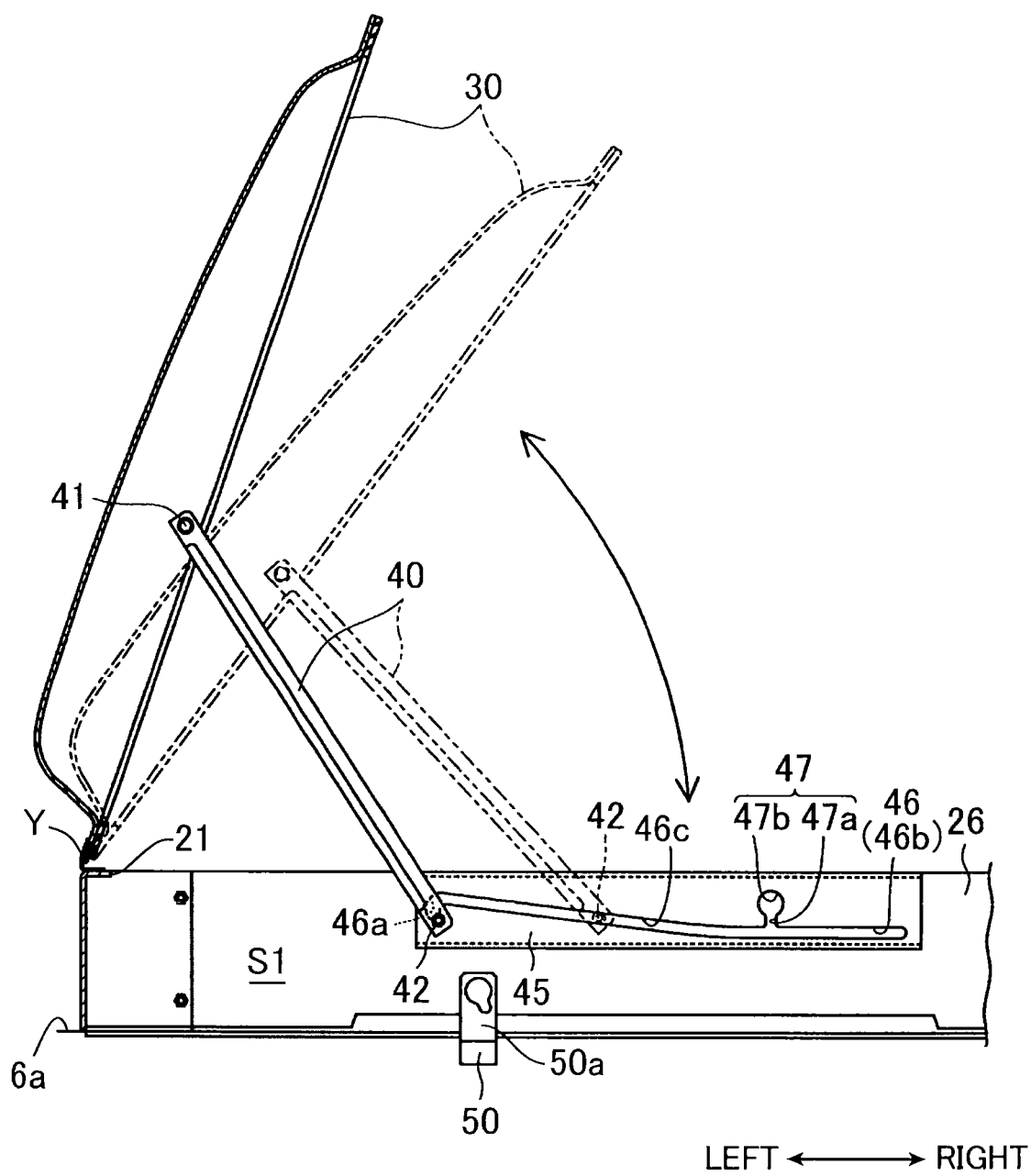
FIG. 7 is a schematic diagram showing an opening and closing action of the hood in the first supporting position.

The stay 40 is a member for supporting the hood 30 with respect to the machine main body 2 in a state where the opening section 21 is opened. Specifically, the stay 40 is provided with an upper end (a first end) pivotably supported with respect to the hood 30 and a lower end (a second end)

supported by the machine main body 2. An attachment position of the lower end of the stay 40 is switchable between a state where the lower end of the stay 40 is supported by the panel 20 as shown in FIG. 7 (hereinafter referred to as first supporting position) and a state where the lower end of the stay 40 is supported by the auxiliary supporting section 50 as shown in FIG. 9 (hereinafter referred to as second supporting position).

In the first supporting position, the stay 40 allows the swinging of the hood 30 between the open position and the closed position and engages with a below-mentioned engaging section 45 of the panel 20 to restrict the swinging of the hood 30 in a state where the hood 30 swings to the open position. The window section 11 can be partially opened by opening the hood 30 in the first supporting position. Therefore, it is possible to perform work such as periodic inspection of the engine related devices through the opening section 21 and the window section 11. In order to efficiently perform the inspection work, portions to be inspected periodically are concentratedly arranged on the lower side of the opening section 21.

Figure 4:
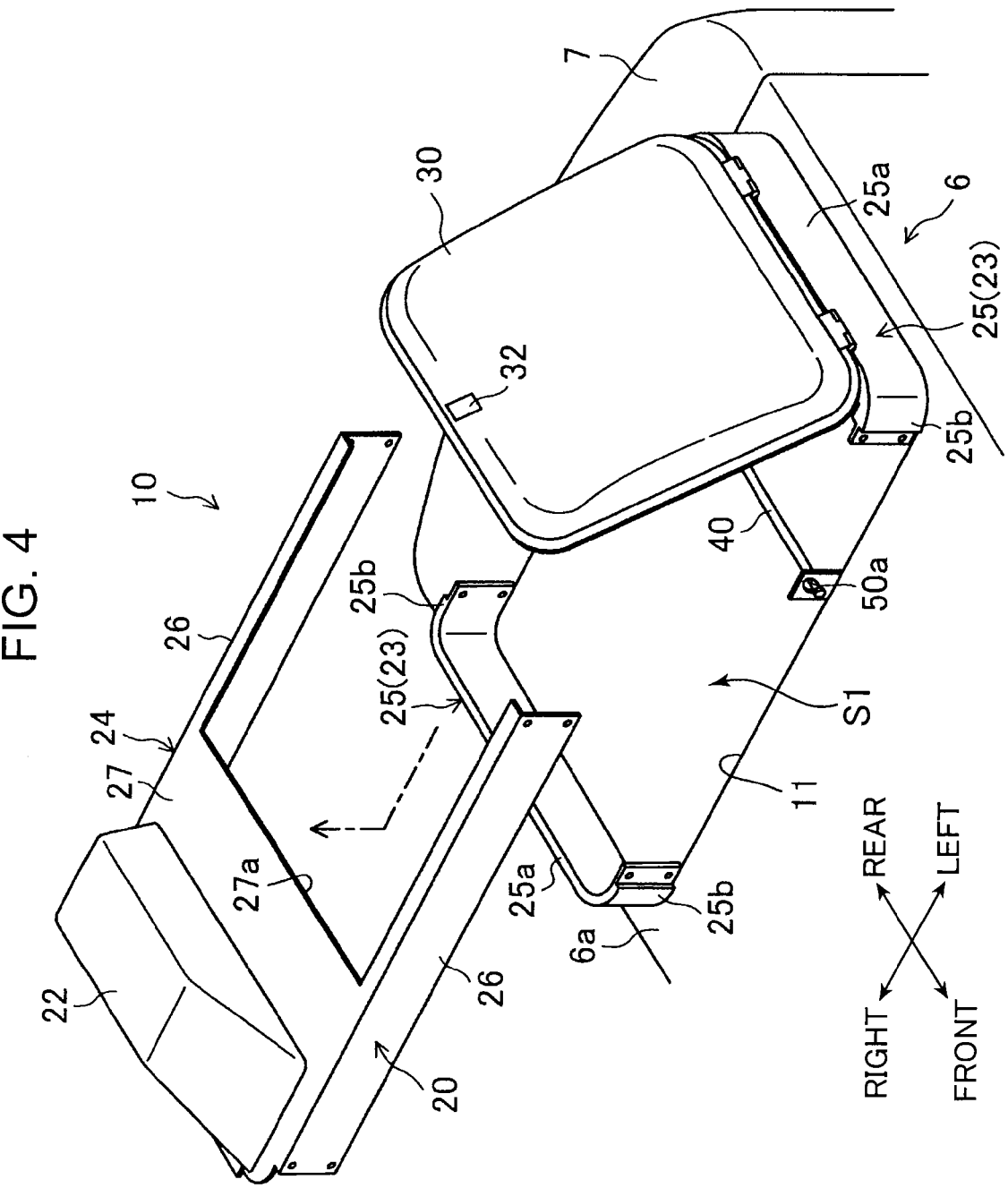
FIG. 4 is a schematic perspective view showing a second supporting position for the hood shown in FIG. 2.

On the other hand, in the second supporting portion, as shown in FIG. 4, work other than the periodic inspection can also be efficiently performed. Specifically, in the second supporting position, since the lower end of the stay 40 is supported by the auxiliary supporting section 50, it is possible to detach a part of the panel 20 from the machine room cover 6a and open the window section 11 as a whole. Note that the work other than the periodic inspection includes maintenance work such as component replacement and repair for the engine related devices.

Figure 5:
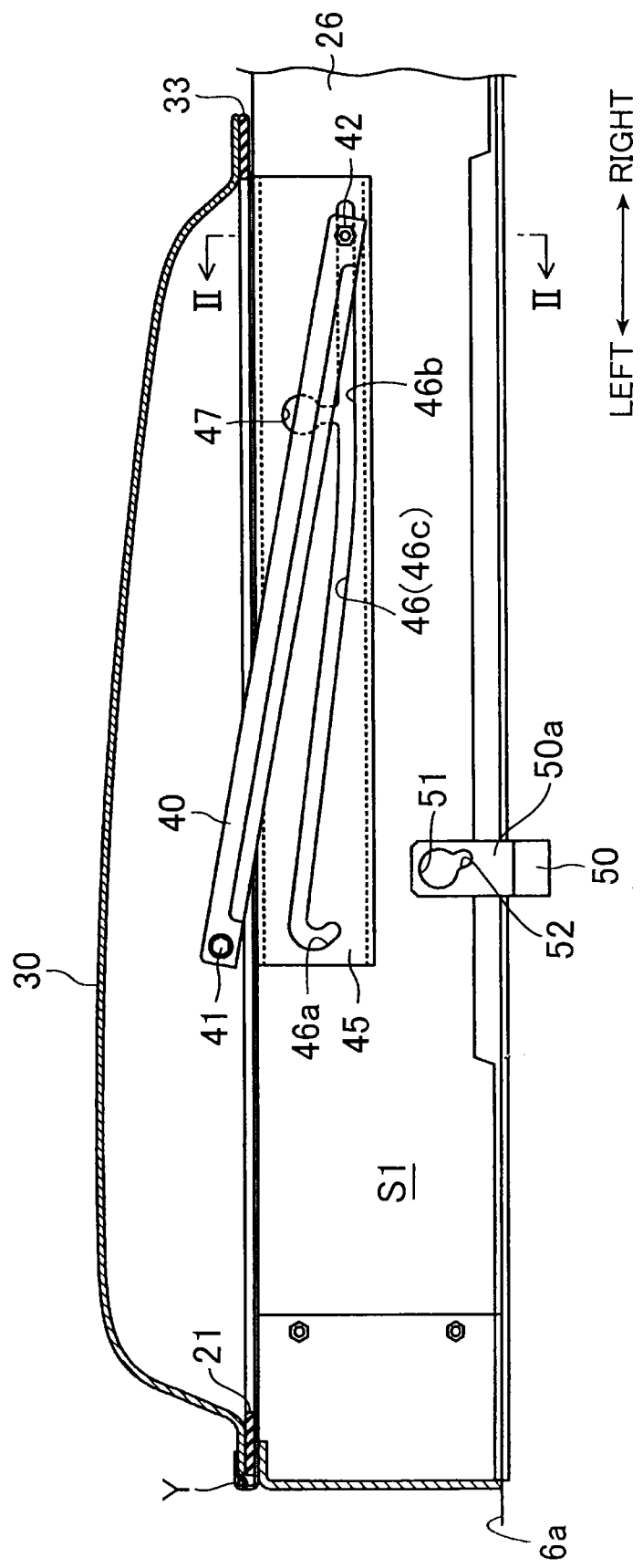
FIG. 5 is a I-I line sectional view in FIG. 2.
Figure 6:
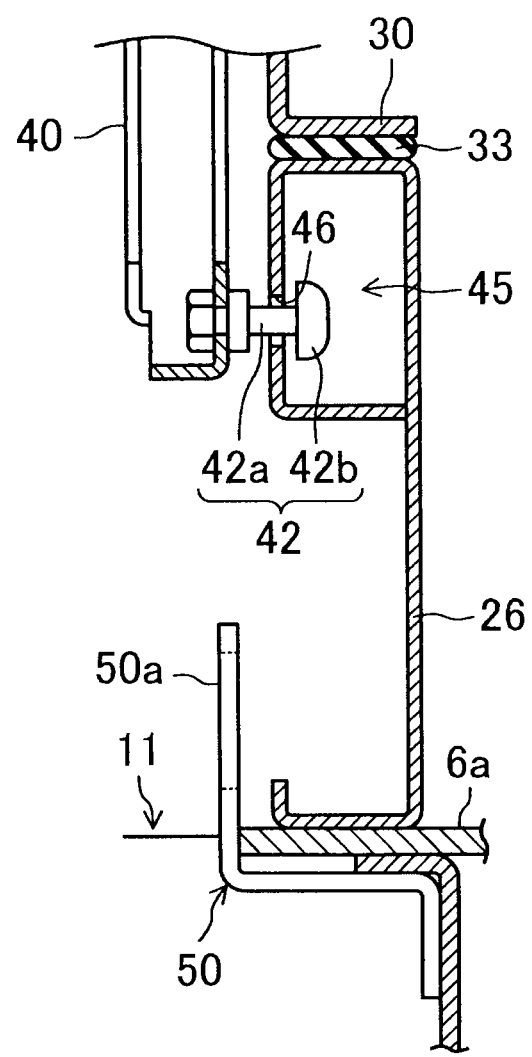
FIG. 6 is a II-II line sectional view in FIG. 5.

Referring to FIG. 5 and FIG. 6, the stay 40 is an elongated member obtained by pressing a steel plate and having a U-shape cross section. A pivotally supporting section 41 is provided at the upper end of the stay 40. The pivotally supporting section 41 is attached pivotably around an axis substantially parallel to the swing axis Y of the hood 30 with respect to one inner side surface (in this embodiment, on the front side) of the hood 30. The pivotally supporting section 41 is located generally in the middle between a proximal end portion and a distal end portion of the hood 30.

A engaged section 42 extending in a direction substantially parallel to the swing axis Y is provided at the lower end of the stay 40. As shown in FIG. 6, the engaged section 42 is provided with a bar-like shaft section 42a projecting in the lateral direction from the stay 40 and a head section 42b provided at the distal end portion of the shaft section 42a. The head section 42b has a diameter dimension larger than the shaft section 42a. The shaft section 42a projects along the direction substantially parallel to the swing axis Y toward a side surface section 26 located on a side where the stay 40 is provided. Note that, in an attachment section of the pivotally supporting section 41 of the stay 40 and the hood 30, play for allowing relative displacement of the engaged section 42 with respect to the hood 30 is provided. Consequently, the engaged section 42 is displaceable in a detaching direction (in this embodiment, backward) substantially parallel to the swing axis Y with respect to the engaging section 45 and the auxiliary supporting section 50.

Schematic configurations of the panel 20 and the auxiliary supporting section 50 that engage with the lower end of the stay 40 are explained below.

As shown in FIG. 4, a part of the panel 20 is attachable and detachable to and from the machine room cover 6a. Specifically, the panel 20 is provided with a first panel (a housing section main body) 23 fixed to the machine room cover 6a and a second panel (an attaching and detaching section) 24 configuring a part of the opening section 21 and attachable and detachable to and from the machine room cover 6a.

The first panel 23 is provided with a pair of frame elements 25 set on both left-and-right sides of the window section 11. The hood 30 is swingably attached to the left end portion of the frame element 25 on the left side. The frame elements 25 are respectively provided with main body sections 25a standing at edges of short sides of the window section 11 and pairs of front and rear extending sections 25b extending along edges of long sides of the window section 11 from both ends of the main body sections 25a.

The second panel 24 is attached between the pairs of extending sections 25b of the first panel 23 opposed to each other in the left-and-right direction. Specifically, the second panel 24 includes a pair of front and rear side surface sections 26 standing at the edges of the long sides of the window section 11 and an upper surface section 27 continuing to the upper edges of the side surface sections 26. A large cutout 27a configuring a part of the opening section 21 is formed in the upper surface section 27. In a state where the cutout 27a is directed to the frame element 25 on the left side to which the hood 30 is attached, the second panel 24 is screwed to the first panel 23. Note that, although the second panel 24 in this embodiment configures a part of the edge portion of the opening section 21, the second panel 24 may be a second panel configuring the entire edge portion of the opening section 21.

The second panel 24 is provided with an engaging section 45 configured to engage with the engaged section 42 of the stay 40. Specifically, as shown in FIG. 6, the engaging section 45 is a section formed in a closed cross section by bending the upper end of the steel plate configuring the side surface section 26 to the inner side. The engaging section 45 extends in the left-right-direction along the side surface section 26. Further, on a wall surface on the inner side of the engaging section 45, a guide groove (an engagement groove) 46 configured to guide the lower end of the stay 40 and a detachment groove 47 branching upward from the guide groove 46 are formed.

The guide groove 46 engages with, in a state where displacement along a first route of the engaged section 42 is allowed, the engaged section 42 such that the hood 30 is allowed to swing between the closed position (see FIG. 5) and the open position (see FIG. 7) and the swinging of the hood 30 is restricted in the open position. Specifically, the guide groove 46 is provided with a horizontal section 46b extending substantially in the horizontal direction, an inclining section 46c inclining to advance further upward toward the left side from the end portion on the left side of the horizontal section 46b, and a supporting and fixing section 46a bending downward from the end portion on the left side of the inclining section 46c. The horizontal section 46b, the inclining section 46c, and the supporting and fixing section 46a have a substantially equivalent width dimension. Specifically, the width dimension of the horizontal section 46b, the inclining section 46c, and the supporting and fixing section 46a is a width dimension for enabling the shaft section 42a of the engaged section 42 to be inserted through and disabling the head section 42b to be inserted and pulled out. Therefore, the lower end of the stay 40 is movable in the left-and-right direction along the guide groove 46 in a state where the lower end of the stay 40 is prevented from coming off backward. The supporting and fixing section 46a inclines to advance further to the right downward. As shown in FIG. 5, the hood 30 is swung to the closed position, whereby the engaged section 42 of the stay 40 is arranged at the right end portion of the horizontal section 46b. On the other hand, as shown in FIG. 7, the hood 30 swings to the open position, whereby the engaged section 42 of the stay 40 falls into the supporting and fixing section 46a. In this state, since the stay 40 inclines downward to the right, the own weight of the hood 30 can be received by the bottom surface of the supporting and fixing section 46a. Consequently, the swinging of the hood 30 toward the closed position is restricted. A moving route of the engaged section 42 along the horizontal section 46b, the inclining section 46c, and the supporting and fixing section 46a configures the first route in this embodiment.

The detachment groove 47 branches from the guide groove 46 and allows displacement of the stay 40 along a second route deviating from the first route, whereby the detachment groove 47 is capable of guiding the engaged section 42 to a position where the engaged section 42 is released from the engagement by the guide groove 46. The detachment groove 47 restricts displacement of the engaged section 42 toward a direction away from the guide groove 46 along the second route and allows detachment of the engaged section 42 by displacing the engaged section 42 backward (in the detaching direction). A specific configuration is explained below.

The detachment groove 47 according to this embodiment is capable of guiding, by displacing the engaged section 42 upward, the engaged section 42 to a position where the engaged section 42 is released from the engagement by the engaging section 45. Specifically, the detachment groove 47 is provided with a lead-in section 47a branching upward from the horizontal section 46b of the guide groove 46 and a detaching section 47b formed above the lead-in section 47a. The lead-in section 47a continues to the guide groove 46 and has a width dimension same as the width dimension of the guide groove 46. The detaching section 47b continues to the lead-in section 47a and has a width dimension larger than the width dimension of the lead-in section 47a. Specifically, the detaching section 47b is a circular hole having a diameter for enabling the head section 42b of the engaged section 42 to be inserted and pulled out. Therefore, the engaged section 42 can be detached from the engaging section 45 by displacing the engaged section 42 in the guide groove 46 upward along the lead-in section 47a and displacing the engaged section 42 in the detaching section 47b backward (the detaching direction substantially parallel to the swing axis Y). Note that, in this embodiment, since the detaching section 47b is formed by a circular hole, upward movement of the engaged section 42 in the detaching section 47b with respect to the engaging section 45 is restricted.

On the other hand, the engaged section 42 can be engaged with the engaging section 45 by inserting the engaged section 42 into the detaching section 47b from the rear and displacing the engaged section 42 downward along the lead-in section 47a. A moving route of the engaged section 42 along the lead-in section 47a and the detaching section 47b configures the second route in this embodiment.

Note that, when the engaged section 42 is displaced along the guide groove 46, the shaft section 42a is displaced while being received by the upward surface of the guide groove 46. Therefore, usually, the shaft section 42a does not come into contact with the upper edge of the guide groove 46. Therefore, even if the detachment groove 47 is provided in the guide groove 46, opening and closing operation for the hood 30 is not hindered.

As explained above, in the engaging section 45 in this embodiment, the engaged section 42 is detachable only when the engaged section 42 moves to the detachment groove 47, that is, only in a state where the hood 30 swings to a predetermined attachment and detachment position. The auxiliary supporting section 50 explained below restricts the swinging of the hood 30 in a position closer to the open position than the attachment and detachment position.

The detachment groove 47 is provided in a position where the engaged section 42 is provided in a state where the hood 30 is swung to a position between the open position (see FIG. 7) and the closed position (see FIG. 5) of the hood 30, specifically, to a position where the operator can most easily hold the hood 30. Further, the detachment groove 47 is provided in a position further to the right side than the center of the guide groove 46.

Figure 8:
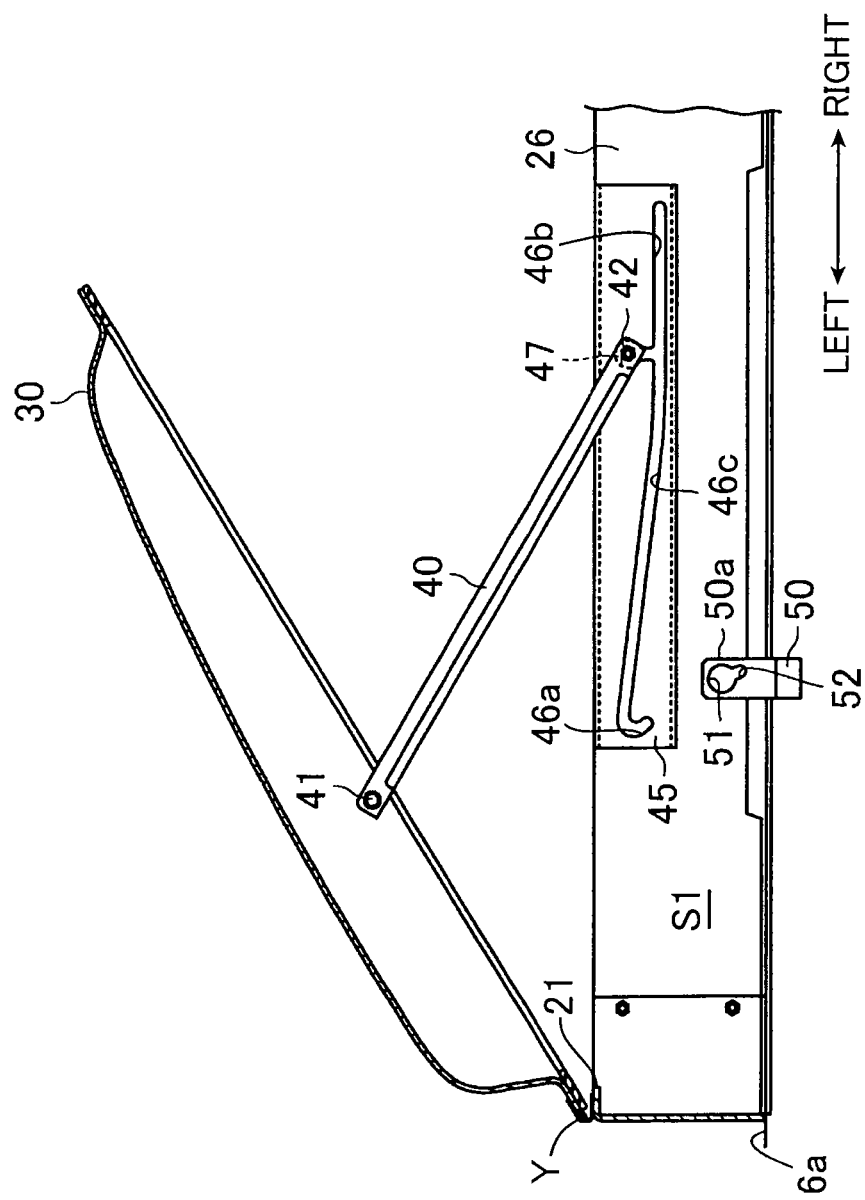
FIG. 8 is a schematic diagram showing a shifting process from the first supporting position to the second supporting position.

As shown in FIG. 8 and FIG. 9, the auxiliary supporting section 50 restricts the swinging of the hood 30 by detachably supporting the engaged section 42 detached from the engaging section 45. The auxiliary supporting section 50 according to this embodiment supports the hood 30 located further on the closed position side than the open position. The auxiliary supporting section 50 is engageable with the engaged section 42 by displacing the engaged section 42 detached from the engaging section 45 in a predetermined direction (in this embodiment, downward).

Specifically, the auxiliary supporting section 50 includes a tabular supporting piece section 50a arranged substantially in parallel to the inner side surface (the rear surface) of the engaging section 45 and extending further upward than the window section 11. In the supporting piece section 50a, an auxiliary engagement groove 52 configured to engage with the engaged section 42 such that the swinging of the hood 30 is restricted and an auxiliary detachment groove 51 extending in an extending direction (in this embodiment, upward) orthogonal to the swing axis Y from the auxiliary engagement groove 52 and capable of guiding the engaged section 42 to a position where the engaged section 42 is released from the engagement by the auxiliary engagement groove 52 are formed. The auxiliary detachment groove 51 is a circular hole having a diameter dimension for enabling the head section 42b of the engaged section 42 to be inserted and pulled out. On the other hand, the auxiliary engagement groove 52 has a width dimension for enabling the shaft section 42a to be inserted through and disabling the head section 42b to be inserted and pulled out. The auxiliary engagement groove 52 is formed along the axis direction of the stay 40 when the engaged section 42 is arranged in a position equivalent to the auxiliary detachment groove 51. Therefore, it is possible to engage the engaged section 42 with the auxiliary supporting section 50 by inserting the engaged section 42 into the auxiliary detachment groove 51 from the rear and displacing the engaged section 42 downward along the auxiliary engagement groove 52.

On the other hand, it is possible to detach the engaged section 42 from the auxiliary supporting section 50 by displacing the engaged section 42 in the auxiliary engagement groove 52 in the extending direction (upward) toward the auxiliary detachment groove 51 and displacing the engaged section 42 in the detaching direction (backward). Note that, in this embodiment, since the auxiliary detachment groove 51 is formed by the circular hole, it is possible to restrict the displacement of the engaged section 42 toward the extending direction (upward) with respect to the auxiliary supporting section 50.

The auxiliary supporting section 50 is fixed to the machine room cover 6a configuring the edge portion of the window section 11 in the machine room S1. Specifically, the auxiliary supporting section 50 is located further downward than the engaging section 45 and further on the left side than the detachment groove 47. The auxiliary supporting section 50 is obtained by pressing a steel plate.

Action of this embodiment is explained below.

As shown in FIG. 5, in a state where the hood 30 swings to the closed position, the engaged section 42 is located on the right side of the guide groove 46 in a state where a gap is left between the engaged section 42 and the right end portion of the guide groove 46. When the hood 30 is gradually opened, as shown in FIG. 7, the engaged section 42 is guided by the guide groove 46 and displaced to a swinging proximal end side without coming off. Further, when the hood 30 is opened to the open position, the shaft section 42a falls into the supporting and fixing section 46a. The hood 30 is supported in an open state.

When the hood 30 is closed, the hood 30 is lifted a little and the engaged section 42 is led into the inclining section 46c from the supporting and fixing section 46a. Once the engaged section 42 moves out from the supporting and fixing section 46a, the engaged section 42 is smoothly guided to the closed position along the guide groove 46 by the own weight of the stay 40 and the engaged section 42 and the inclination of the guide groove 46. Therefore, it is possible to close the hood 30 without a sense of discomfort.

Next, the second supporting position where the engaged section 42 is supported by the auxiliary supporting section 50 is explained.

To establish the second supporting position, first, work for detaching the engaged section 42 from the engaging section 45 is necessary. The detachment groove 47 is provided in the guide groove 46 to enable even one person can perform the work without using tools. Specifically, the engaged section 42 can be detached as explained below using the detachment groove 47.

As shown in FIG. 8, the lower end of the stay 40 is lifted in a state where the hood 30 is lifted and the engaged section 42 is displaced to the lower side of the detachment groove 47. Consequently, the engaged section 42 can be led into the detachment groove 47. In this state, the head section 42b can be pulled out from the detaching section 47b by displacing the head section 42b sideward (backward). Consequently, it is possible to easily detach the engaged section 42 from the engaging section 45.

After the engaged section 42 is detached from the engaging section 45, as shown in FIG. 9, the stay 40 is operated with the hood 30 lifted a little and the engaged section 42 is inserted into the auxiliary detachment groove 51 from a side (the rear). In this way, when the hand is released from the hood 30, the engaged section 42 engages with the auxiliary engagement groove 52. Consequently, it is possible to stably support the stay 40 in a state where the opening section 21 is opened.

In this state, as shown in FIG. 4, the second panel 24 including the side surface section 26 is detached from the machine room cover 6a. Consequently, it is possible to detach the second panel 24 in a state where the hood 30 is opened. Since maintenance work or the like can be performed in a state where the window section 11 is wide opened, it is possible to efficiently perform the work.

As explained above, in the present invention, the second panel 24 configuring at least a part of the edge portion of the opening section 21, and attachable and detachable to and from the machine room cover 6a in a state where the engaged section 42 of the stay 40 is supported by the auxiliary supporting section 50 is provided. Consequently, it is possible to open the machine room 51 in a range wider than the opening section 21 in a state where the engaged section 42 of the stay 40 is supported by the auxiliary supporting section 50. Therefore, it is easy to perform work such as maintenance.

In the embodiment, it is possible to lead, by displacing the engaged section 42 of the stay 40 along the detachment groove 47, the engaged section 42 of the stay 40 to the position where the engaged section 42 is released from the engagement by the guide groove 46. Therefore, compared with the conventional shovel in which the pins and the screws are required to be attached and detached, it is possible to easily detach the engaged section 42 of the stay 40 from the second panel 24.

In this way, in the embodiment, it is possible to detach the stay 40 from the second panel 24 simply by displacing the stay 40 along the detachment groove 47 while the hood 30 is opened. Therefore, according to the embodiment, compared with the related art, the work of moving the stay 40 is easy.

In the embodiment, the auxiliary supporting section 50 is engageable with the engaged section 42 by displacing the engaged section 42 of the stay 40 in the predetermined directions (forward and downward). Consequently, it is possible to engage the stay 40 with the auxiliary supporting section 50 simply by displacing the engaged section 42 with respect to the auxiliary supporting section 50. Therefore, compared with the conventional hydraulic shovel in which the pins and the screws are required to be attached and detached, it is easy to perform work for moving the engaged section 42 of the stay 40 to the auxiliary supporting section 50.

Therefore, according to the embodiment, even one person can safely and simply perform the work of moving the stay 40 without using tools.

In the embodiment, the auxiliary supporting section 50 restricts the swinging of the hood 30 in the position closer to the open position than the attachment and detachment position. Consequently, the operator can detach the engaged section 42 of the stay 40 from the second panel 24 while the hood 30 is swung to the open position, further swing the hood 30 toward the open position, and attach the engaged section 42 to the auxiliary supporting section 50. Therefore, it is possible to perform movement of the stay 40 in a process of a series of operations for opening the hood 30.

According to the embodiment, the stay 40 rotates with respect to the hood 30 according to the swinging of the hood 30 and the engaged section 42 is displaced in the direction orthogonal to the swing axis Y along the first route according to the rotating of the stay 40.

In the embodiment, the detaching section 47b restricts the displacement of the engaged section 42 toward the direction away from the guide groove 46 along the second route and allows detachment of the engaged section 42 according to backward displacement of the engaged section 42. Consequently, it is possible to detach the engaged section 42 from the second panel 24 by displacing the engaged section 42 along the detachment groove 47 and displacing the engaged section 42 backward in the detaching section 47b. On the other hand, it is possible to engage the engaged section 42 with the second panel 24 by displacing the engaged section 42 forward and inserting the engaged section 42 into the detaching section 47b and, in this state, inserting the engaged section 42 into the guide groove 46 along the detachment groove 47.

In the embodiment, for example, even when the engaged section 42 is led into the detachment groove 47 by mistake when the hood 30 is opened, the movement of the engaged section 42 toward the direction away from the guide groove 46 is restricted by the detaching section 47b. Consequently, it is possible to suppress the engaged section 42 from separating from the second panel 24. Therefore, it is possible to prevent a situation where the engaged section 42 comes off the second panel 24 against the intention of the operator and the hood 30 can freely swing without being supported by the stay 40. Therefore, according to the embodiment, it is possible to more safely perform the work of moving the stay 40.

In the embodiment, the auxiliary supporting section 50 includes the auxiliary engagement groove 52 and the auxiliary detachment groove 51 capable of guiding the engaged section to the position where the engaged section is released from the engagement by the auxiliary engagement groove 52. Consequently, it is possible to detach the engaged section 42 from the auxiliary supporting section 50 by displacing the engaged section 42 along the auxiliary detachment groove 51.

In the embodiment, the auxiliary detachment groove 51 restricts upward displacement of the engaged section 42 and allows detachment of the engaged section 42 from the auxiliary engagement groove 52 by displacing the engaged section 42 backward. Consequently, it is possible to detach the engaged section 42 from the auxiliary supporting section 50 by displacing the engaged section 42 upward from the auxiliary engagement groove 52 and displacing the engaged section 42 backward in the auxiliary detachment groove 51. On the other hand, it is possible to engage the engaged section 42 with the auxiliary supporting section 50 by displacing the engaged section 42 forward and inserting the engaged section 42 into the auxiliary detachment groove 51 and, in this state, inserting the engaged section 42 into the auxiliary engagement groove 52.

In the embodiment, for example, even when the engaged section 42 is led into the auxiliary detachment groove 51 by mistake when the hood 30 is opened, upward displacement of the engaged section 42 is restricted by the auxiliary detachment groove 51. Consequently, it is possible to suppress the engaged section 42 from separating from the auxiliary supporting section 50. Therefore, it is possible to prevent a situation where the engaged section 42 comes off the auxiliary supporting section 50 against the intention of the operator and the hood 30 can freely swing without being supported by the stay 40. Therefore, according to the embodiment, it is possible to more safely perform the work of moving the stay 40.

In this embodiment, since the panel 20 is standing on the machine room cover 6a, it is possible to broaden the machine room S1 by using a space in the panel 20 as the machine room S1. The panel 20 includes the first panel 23 fixed to the machine room cover 6a and configured to support the hood 30 and the second panel 24 attachable and detachable to and from the machine room cover 6a. Therefore, it is easy to perform maintenance of the devices arranged in the panel 20 by detaching the second panel 24 from the machine room cover 6a. As explained above, it is possible to support the hood 30 in a state where the machine room S1 is more widely opened by detaching the second panel 24 from the machine room cover 6a in a state where the engaged section 42 of the stay 40 is moved to the auxiliary supporting section 50. Therefore, according to the embodiment, it is possible to improve workability of inspection work and maintenance work.

Note that the operating machine according to the present invention is not limited to the embodiment explained above and includes various configurations other than the embodiment.

In the example explained in the embodiment, the lid member and the attaching and detaching section according to the present invention are applied to the bonnet 10. However, the present invention is not limited to the example. For example, the lid member may be directly attached to the machine room cover 6a to enable the window section 11 (equivalent to the opening section) to be opened and closed and a part of the machine room cover 6a configuring the edge portion of the window section 11 may be detachable from the other portions as the detaching and attaching section. In that case, the auxiliary supporting section 50 only has to be attached to a device in the machine housing section 6.

The stay 40 may be provided on both sides in the front-and-rear direction of the hood 30. For safety, it is preferable to provide the lead-in section 47a in the detachment groove 47. However, the lead-in section 47a is not essential. The structure of the engaging section and the guide groove is an example and can be changed as appropriate according to specification.

Note that inventions having configurations explained below are mainly included in the specific embodiment explained above.

That is, the present invention provides a machine main body provided on a lower propelling body of an operating machine, the machine main body including: a machine housing section configured to form a machine room for housing a predetermined machine, and including an opening section for opening the machine room upward; a lid member swingable with respect to the machine housing section between a closed position for closing the opening section and an open position for opening the opening section; a supporting member including a first end rotatably supported with respect to the lid member and a second end detachably supported to the machine housing section, the supporting member supporting the lid member such that the swinging of the lid member is restricted in a predetermined swinging position; and an auxiliary supporting section provided in the machine room and configured to detachably support the second end of the supporting member detached from the machine housing section such that the swinging of the lid member is restricted. The machine housing section includes: a housing section main body; and an attaching and detaching section configuring at least a part of an edge portion of the opening section, and attachable and detachable to and from the housing section main body in a state where the second end of the supporting member is supported by the auxiliary supporting section. The attaching and detaching section includes: an engagement groove configured to engage with, in a state where displacement of the second end of the supporting member along a first route is allowed, the second end of the supporting member such that the lid member is allowed to swing between the closed position and the open position and the swinging of the lid member is restricted in the open position; and a detachment groove branching from the engagement groove and capable of guiding, by allowing displacement of the second end of the supporting member along a second route deviating from the first route, the second end of the supporting member to a position where the second end is released from the engagement by the engagement groove.

In the present invention, the attaching and detaching section configuring at least a part of the edge portion of the opening section and attachable and detachable to and from the housing section main body in a state where the second end of the supporting member is supported by the auxiliary supporting section is provided. Consequently, in the state where the second end of the supporting member is supported by the auxiliary supporting section, it is possible to open the machine room in a range wider than the opening section. Therefore, it is easy to perform work such as maintenance.

In the present invention, it is possible to lead, by displacing the second end of the supporting member along the detachment groove, the second end of the supporting member to a position where the second end of the supporting member is released from the engagement by the engagement groove. Therefore, compared with the hydraulic shovel described in Patent Document 2 in which the pins and the screws are required to be attached and detached, it is possible to easily detach the second end of the supporting member from the attaching and detaching section.

In this way, in the present invention, it is possible to detach the supporting member from the attaching and detaching section simply by displacing the supporting member along the detachment groove while the lid member is opened. Therefore, according to the present invention, compared with the related art, it is easy to perform the work of moving the supporting member.

It is preferable that, in the machine main body, the auxiliary supporting section is engageable with the second end of the supporting member by displacement, in a predetermined direction, of the second end of the supporting member detached from the engaging section.

In this aspect, the auxiliary supporting section is engageable with the second end by displacing the second end of the supporting member in the predetermined direction. Consequently, it is possible to engage the supporting member with the auxiliary supporting section simply by displacing the second end with respect to the auxiliary supporting section. Therefore, compared with the hydraulic shovel described in Patent Document 2 in which the pins and the screws are required to be attached and detached, it is easy to perform work for moving the second end of the supporting member to the auxiliary supporting section.

Therefore, according to the aspect, even one person can safely and simply perform the work of moving the supporting member without using tools.

It is preferable that, in the machine main body, the detachment groove allows displacement of the second end of the supporting member along the second route only in a state where the lid member swings to a predetermined attachment and detachment position between the closed position and the open position, and the auxiliary supporting section restricts the swinging of the lid member in a position closer to the open position than the attachment and detachment position.

In this aspect, the auxiliary supporting section restricts the swinging of the lid member in the position closer to the open position than the attachment and detachment position. Consequently, the operator can detach the second end of the supporting member from the attaching and detaching section while swinging the lid member to the open position and attach the second end to the auxiliary supporting section by further swinging the lid member to the open position. Therefore, it is possible to perform movement of the supporting member in a process of a series of operations for opening the lid member.

It is preferable that, in the machine main body, the first end of the supporting member is rotatable with respect to the lid member around an axis substantially parallel to a swing axis of the lid member with respect to the machine housing section, the second end of the supporting member includes an engaged section extending substantially in parallel to the swing axis, and the engagement groove and the detachment groove engage with the engaged section such that the engaged section is displaceable in a direction orthogonal to the swing axis with respect to the attaching and detaching section.

According to this aspect, the supporting member rotates with respect to the lid member according to the swinging of the lid member and the engaged section is displaced in the direction orthogonal to the swing axis along the first route according to the rotating of the supporting member.

It is preferable that, in the machine main body, the engaged section is displaceable in a detaching direction substantially parallel to the swing axis with respect to the attaching and detaching section, and the detachment groove includes a detaching section configured to restrict displacement of the engaged section toward a direction away from the engagement groove along the second route and allow detachment of the engaged section by displacement of the engaged section in the detaching direction.

In this aspect, the detaching section restricts the displacement of the engaged section toward the direction away from the engagement groove along the second route and allows the detachment of the engaged section by displacement of the engaged section in the detaching direction. Consequently, it is possible to detach the engaged section from the attaching and detaching sections by displacing the engaged section along the detachment groove and displacing the engaged section in the detaching direction in the detaching section. On the other hand, it is possible to engage the engaged section with the attaching and detaching section by inserting the engaged section into the detaching section in an opposite direction of the detaching direction and, in this state, inserting the engaged section into the engagement groove along the detachment groove.

In the aspect, for example, even when the engaged section is led into the detachment groove by mistake when the lid member is opened, movement of the engaged section toward the direction away from the engagement groove is restricted by the detaching section. Consequently, it is possible to suppress the engaged section from separating from the attaching and detaching section. Therefore, it is possible to prevent a situation in which the engaged section comes off the attaching and detaching section against the intention of the operator and the lid member can freely swing without being supported by the supporting member. Therefore, according to the aspect, it is possible to more safely perform the work of moving the supporting member.

It is preferable that, in the machine main body, the auxiliary supporting section includes: an auxiliary engagement groove configured to engage with the engaged section such that the swinging of the lid member is restricted; and an auxiliary detachment groove configured to extend from the auxiliary engagement groove in an extending direction orthogonal to the swing axis and capable of guiding the engaged section to a position where the engaged section is released from the engagement by the auxiliary engagement groove.

In this aspect, the auxiliary supporting section includes the auxiliary engagement groove and the auxiliary detachment groove capable of guiding the engaged section to the position where the engaged section is released from the engagement by the auxiliary engagement groove. Consequently, it is possible to detach the engaged section from the auxiliary supporting section by displacing the engaged section along the auxiliary detachment groove.

It is preferable that, in the machine main body, the engaged section is displaceable in the detaching direction with respect to the auxiliary supporting section, and the auxiliary detachment groove restricts displacement of the engaged section toward the extending direction and allows detachment of the engaged section by displacement of the engaged section in the detaching direction.

In this aspect, the auxiliary detachment groove restricts the displacement of the engaged section toward the extending direction and allows the detachment of the engaged section from the auxiliary engagement groove by displacing the engaged section in the detaching direction. Consequently, it is possible to detach the engaged section from the auxiliary supporting section by displacing the engaged section in the extending direction from the auxiliary engagement groove and displacing the engaged section in the detaching direction in the auxiliary detachment groove. On the other hand, it is possible to engage the engaged section with the auxiliary supporting section by inserting the engaged section into the auxiliary detachment groove in an opposite direction of the detaching direction and, in this state, inserting the engaged section into the auxiliary engagement groove.

In the aspect, for example, even when the engaged section is led into the auxiliary detachment groove by mistake when the lid member is opened, the displacement of the engaged section toward the extending direction is restricted by the auxiliary detachment groove. Consequently, it is possible to suppress the engaged section from separating from the auxiliary supporting section. Therefore, it is possible to prevent a situation in which the engaged section comes off the auxiliary supporting section against the intention of the operator and the lid member can freely swing without being supported by the supporting member. Therefore, according to the aspect, it is possible to more safely perform the work of moving the supporting member.

In the machine main body, the auxiliary supporting section can be fixed to the housing section main body. On the other hand, the auxiliary supporting section may be attached to a predetermined device provided in the machine room.

It is preferable that, in the machine main body, the machine housing section includes: a machine room cover configuring the housing section main body; and a panel standing on the machine room cover, the opening section being formed on an upper surface of the panel, and the panel includes: a first panel fixed to the machine room cover, configured to swingably support the lid member, and configuring the housing section main body; and a second panel configuring the attaching and detaching section attachable and detachable to and from the machine room cover.

In this aspect, since the panel is standing on the machine room cover, it is possible to broaden the machine room by using a space in the panel as the machine room. The panel includes the first panel fixed to the machine room cover and configured to support the lid member, and a second panel attachable and detachable to and from the machine room cover. Therefore, it is easy to perform maintenance of devices arranged in the panel by detaching the second panel from the machine room cover. As explained above, it is possible to support the lid member in a state where the machine room is opened wider by detaching the second panel from the machine room cover in a state where the second end of the supporting member is moved to the auxiliary supporting section. Therefore, according to the aspect, it is possible to improve workability of inspection work and maintenance work.

The present invention provides an operating machine including: a lower propelling body; and the machine main body provided on the lower propelling body.

INDUSTRIAL APPLICABILITY

According to the present invention, it is possible to easily perform the work of moving a supporting member for supporting a lid member with respect to a machine housing section.

EXPLANATION OF REFERENCE NUMERALS

S1 Machine room
Y Swing axis
1 Hydraulic shovel (Operating machine)
2 Machine main body
3 Lower propelling body
6 Machine housing section
6a Machine room cover (Housing section main body)
20 Panel
21 Opening section
23 First panel (Housing section main body)
24 Second panel (Attaching and detaching section)
30 Hood (Lid member)
40 Stay (Supporting member)
41 Pivotally supporting section (First end of the supporting member)
42 Engaged section (Second end of the supporting member)
45 Engaging section
46 Guide groove (Engagement groove)
47 Detachment groove
50 Auxiliary supporting section
51 Auxiliary detachment groove
52 Auxiliary engagement groove

The invention claimed is:

1. A machine main body provided on a lower propelling body of an operating machine, the machine main body comprising:
    a machine housing section configured to form a machine room for housing a predetermined machine, and including an opening section for opening the machine room upward;
    a lid member swingable with respect to the machine housing section between a closed position for closing the opening section and an open position for opening the opening section;
    a supporting member including a first end rotatably supported with respect to the lid member and a second end detachably supported to the machine housing section, the supporting member supporting the lid member such that the swinging of the lid member is restricted in a predetermined swinging position; and
    an auxiliary supporting section provided in the machine room and configured to detachably support the second end of the supporting member detached from the machine housing section such that the swinging of the lid member is restricted, wherein
    the machine housing section includes: a housing section main body; and an attaching and detaching section configuring at least a part of an edge portion of the opening section, and attachable and detachable to and from the housing section main body in a state where the second end of the supporting member is supported by the auxiliary supporting section, and
    the attaching and detaching section includes: an engagement groove configured to engage with, in a state where displacement of the second end of the supporting member along a first route is allowed, the second end of the supporting member such that the lid member is allowed to swing between the closed position and the open position and the swinging of the lid member is restricted in the open position; and a detachment groove branching from the engagement groove and capable of guiding, by allowing displacement of the second end of the supporting member along a second route deviating from the first route, the second end of the supporting member to a position where the second end is released from the engagement by the engagement groove.

2. The machine main body according to claim 1, wherein the auxiliary supporting section is engageable with the second end of the supporting member by displacement, in a predetermined direction, of the second end of the supporting member detached from the engagement groove.

3. The machine main body according to claim 1, wherein the detachment groove allows displacement of the second end of the supporting member along the second route only in a state where the lid member swings to a predetermined attachment and detachment position between the closed position and the open position, and
the auxiliary supporting section restricts the swinging of the lid member in a position closer to the open position than the attachment and detachment position.

4. The machine main body according to claim 1, wherein
the first end of the supporting member is rotatable with respect to the lid member around an axis substantially parallel to a swing axis of the lid member with respect to the machine housing section,
the second end of the supporting member includes an engaged section extending substantially in parallel to the swing axis, and
the engagement groove and the detachment groove engage with the engaged section such that the engaged section is displaceable in a direction orthogonal to the swing axis with respect to the attaching and detaching section.

5. The machine main body according to claim 4, wherein
the engaged section is displaceable in a detaching direction substantially parallel to the swing axis with respect to the attaching and detaching section, and
the detachment groove includes a detaching section configured to restrict displacement of the engaged section toward a direction away from the engagement groove along the second route and allow detachment of the engaged section by displacement of the engaged section in the detaching direction.

6. The machine main body according to claim 4, wherein
the auxiliary supporting section includes: an auxiliary engagement groove configured to engage with the engaged section such that the swinging of the lid member is restricted; and an auxiliary detachment groove configured to extend from the auxiliary engagement groove in an extending direction orthogonal to the swing axis and capable of guiding the engaged section to a position where the engaged section is released from the engagement by the auxiliary engagement groove.

7. The machine main body according to claim 6, wherein
the engaged section is displaceable in the detaching direction with respect to the auxiliary supporting section, and
the auxiliary detachment groove restricts displacement of the engaged section toward the extending direction and allows detachment of the engaged section by displacement of the engaged section in the detaching direction.

8. The machine main body according to claim 1, wherein the auxiliary supporting section is fixed to the housing section main body.

9. The machine main body according to claim 1, wherein
the machine housing section includes: a machine room cover configuring the housing section main body; and a panel standing on the machine room cover, the opening section being formed on an upper surface of the panel, and
the panel includes: a first panel fixed to the machine room cover, configured to swingably support the lid member, and configuring the housing section main body; and a second panel configuring the attaching and detaching section attachable and detachable to and from the machine room cover.

10. An operating machine comprising:
the lower propelling body; and
the machine main body according to claim 1 provided on the lower propelling body.

* * * * *